United States Patent [19]

Kasai et al.

[11] 4,444,330
[45] Apr. 24, 1984

[54] MEDICAL CONTAINER STOPPER

[75] Inventors: Masaaki Kasai, Zama; Toshiji Ichikawa, Tokyo, both of Japan

[73] Assignee: Terumo Kabushiki Kaisha, Tokyo, Japan

[21] Appl. No.: 402,281

[22] Filed: Jul. 27, 1982

[30] Foreign Application Priority Data

Oct. 2, 1981 [JP] Japan ................................ 56-157278

[51] Int. Cl.$^3$ ............................................ B65D 39/00
[52] U.S. Cl. .................................................... 215/247
[58] Field of Search ................................ 215/247, 355

[56] References Cited

U.S. PATENT DOCUMENTS 3,136,440 6/1964 Krug et al. .......................... 215/247

Primary Examiner—Donald F. Norton
Attorney, Agent, or Firm—Frishauf, Holtz, Goodman & Woodward

[57] ABSTRACT

A stopper for hermetically sealing the opening of a medical container is made of an injection-moldable polymeric material containing a blend of 30 to 90% by weight of a butyl-based rubber and 70 to 10% by weight of a thermoplastic elastomer.

14 Claims, 5 Drawing Figures

MEDICAL CONTAINER STOPPER

BACKGROUND OF THE INVENTION

I. Field of the Invention

The present invention relates to a medical container stopper which hermetically seals the opening of a medical container.

II. Description of the Prior Art

In order to maintain a given internal negative pressure or to seal the contents from ambient atmosphere, a stopper hermetically seals the opening of a hard medical container such as a vacuum blood collecting tube or an infusion solution bottle. Vulcanized butyl rubber is generally used for a stopper for hermetically sealing a medical container of this type. Vulcanized butyl rubber provides an excellent hermetic seal due to its rubber-like elasticity.

However, additives such as sulfur or a vulcanization accelerator contained in the vulcanized butyl rubber may elute into the blood inside a medical container, thus impairing blood analysis. The problem of elution of the additives is also encountered in the case of sealing infusion bottles. In order to counteract this problem, the surface of a rubber stopper which will be brought into contact with an infusion solution is conventionally coated with a plastic so as to prevent the additives contained in the rubber from eluting into the infusion solution during autoclave sterilization.

In addition to this problem, when a conventional vulcanized butyl rubber stopper comes into contact with blood, blood clots are deposited on the stopper, and this also adversely affects the analysis and test reliability.

SUMMARY OF THE INVENTION

It is, therefore, an object of the present invention to provide a medical container stopper which solves the problems of the prior art, exhibits rubber-like elasticity, does not contain additives which might cause elution, has excellent re-sealability after being pierred with a needle or cannula, and is thermoplastic.

In order to achieve this object, there is provided according to the present invention a medical container stopper hermetically sealing an opening of a medical container, comprising an injection moldable polymeric material which includes a blend of 30 to 90% by weight of a butyl-based rubber and 70 to 10% by weight of a thermoplastic elastomer.

In general, the butyl-based rubber is selected from polyisobutylene, butyl rubber, partially crosslinked butyl rubber, and a halogenated butyl rubber. The thermoplastic elastomer is generally selected from polyester elastomer, styrene-based elastomer, 1,2-polybutadiene, and polyolefin elastomer.

Moldability is improved if the polymeric material contains a moldability improving olefin-based polymer in an amount of up to 30% by weight. The moldability improving olefin-based polymer is generally selected from polypropylene, polyethylene, ethylene-ethyl acrylate copolymer, liquid paraffin, wax, and ethylene-vinyl acetate copolymer.

The polymeric material may also contain a filler in an amount of up to 80% by weight of the total weight of filler and blend. The filler is generally selected from carbon black, clay, talc and white carbon.

DETAILED DESCRIPTION OF THE PREFERRED EMBODIMENTS

Figure 1:
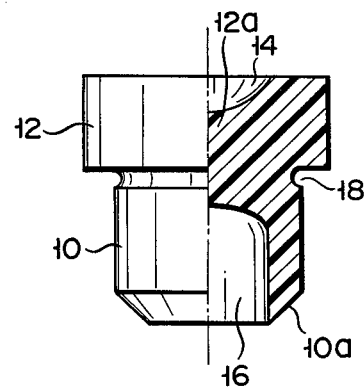
FIGS. 1 to 3 are partially sectional side views of different medical container stoppers according to the present invention.

The present inventors have made extensive studies in an attempt to find a material which is suitable as a material for a medical container stopper, that is, a material which does not contain additives that might cause elution and which has a satisfactory gas barrier property. As a result of such studies, it has been found that a blend of a butyl-based rubber with a thermoplastic elastomer in a predetermined mixing ratio provides excellent stoppers.

A medical container stopper of the present invention basically comprises a blend of 30 to 90% by weight of a butyl-based rubber and 70 to 10% by weight of a thermoplastic elastomer. The butyl-based rubber is used mainly to give a satisfactory gas barrier property to the resultant stopper. If the butyl-based rubber is contained in the amount of less than 30% by weight, a stopper having a satisfactory gas barrier property as a medical container stopper cannot be provided. Since the butyl-based rubber has a relatively great compressive set and low impact resilience and hardness, it is easily subject to permanent set. Therefore, the butyl-based rubber alone cannot provide a stopper for hermetically sealing a medical container. Therefore, a thermoplastic elastomer is mixed to improve the hermetic sealability according to the present invention. The amount of the thermoplastic elastomer is to fall within the range of 70 to 10% by weight. If the amount of the thermoplastic elastomer exceeds 70% by weight, the effects of the butyl-based rubber may not be obtained. On the other hand, if the amount of the thermoplastic elastomer is less than 10% by weight, the effects of the thermoplastic elastomer may not be satisfactory.

Examples of the butyl-based rubber which may be used in the present invention include polyisobutylenes such as those having a viscosity-average molecular weight of 15,000 to 200,000 and preferably 80,000 to 150,000 (e.g., Vistanex MML-100 or MML-140 available from Exxon Chemical Ltd.); butyls such as those having a Mooney viscosity $ML_{1+8}$ (100° C.) of 20 to 100 and preferably 40 to 70 and an unsaturation content of 0.3 to 3.0 mol% and preferably 0.7 to 1.5 mol% (e.g., Essobutyl 065 or 365 available from Exxon Chemical Ltd., or Polysarbutyl 100 or 402 available from Polysar Ltd.); partially crosslinked butyl rubbers such as those having a cyclohexane soluble content of 50% by weight (e.g., PBXL-50 available from Polysar Ltd.); and halogenated butyl rubber such as those having a Mooney viscosity $ML_{1+8}$ (100° C.) of 20 to 100 and preferably 40 to 70, an unsaturation content of 0.1 to 3.0 mol% and preferably 0.7 to 2.0 mol%, and a halogen content of 0.5 to 3.0% by weight (e.g., Chlorobutyl 1066 available from Exxon Chemical Ltd. or Bromobutyl XZ available from Polysar Ltd.)

Examples of the thermoplastic elastomer include polyester elastomers such as those having an impact resilience of 30% or more, according to JISK6301, and a melting point of 220° C. or lower (Toray polyester elastomer type S or type H available from Toray Industries, Inc. or Pelprene P-150B and P-150M available from Toyobo Co., Ltd.); polyolefin elastomers such as ethylene-propylene copolymer rubbers or ethylene-propylene-nonconjugated diene copolymers having a Mooney viscosity $ML_{1+4}$ (100° C.) of 30 to 95 and preferably 40 to 80, partially crosslinked ethylene-propylene rubbers, propylene graft ethylene-propylene rubbers and isobutylene graft polyethylenes each having a compressive set (70° C.×22 hours) of 30 to 98% and preferably 30 to 60% (e.g., Esprene 301 or 505 available from Sumitomo Chemical Co., Ltd., Thermorun 3600 available from Mitsubishi Petrochemical Co., Ltd. or Milastomer 5285 available from Mitsui Petrochemical Industries Ltd.); styrene-based elastomers, polyamide-type elastomer; and 1,2-polybutadiene.

In the blend of the butyl-based rubber and the thermoplastic elastomer, the ratio of the butyl-type rubber is preferably within the range of 50 to 70% by weight.

The blend as described above can be used alone for the stopper of the present invention. However, it is preferable to add a predetermined olefin-based polymer in order to improve moldability, especially injection-moldability. Examples of such olefin-based polymers for improving moldability include polypropylenes having a melt index (g/10 minutes, according to ASTMD1238) of 0.5 to 200 (e.g., Idemitsu Polyprop J-400M available from Idemitsu Petrochemical Co., Ltd.); polyethylene (e.g., Yukalon LK-30 available from Mitsubishi Petrochemical Co., Ltd.); ethylene-ethyl acrylate copolymers (e.g., NVC copolymer DPDJ-9169 available from Nippon Unicar Co., Ltd.); ethylene-vinyl acetate copolymers (e.g., Ultrathen UE 633 available from Toyo Soda Manufacturing Ltd.); liquid paraffin; and wax. The olefin-based polymer is added to the mixture in the amount of not more than 30% by weight of the weight of the mixture and preferably within the range of 10 to 20% by weight.

The polymeric material of the composition as described above may further contain a filler such as carbon black (e.g., Carbon #55 available from Asahi Carbon Co., Ltd.), clay (e.g., Crown Clay available from South Eastern Clay Inc., or Hard Top Clay available from Shiraishi Calcium Kaisha, Ltd.), talc, and white carbon (e.g., Fine Seal available from Tokuyama Soda Co., Ltd.). The filler is added to the polymeric material in the amount of not more than 80% by weight and preferably 20 to 40% by weight based on the total weight of filler and polymeric material. The filler serves to reinforce the mechanical strength of the stopper as well as to improve the gas barrier property of the stopper.

Figure 2:
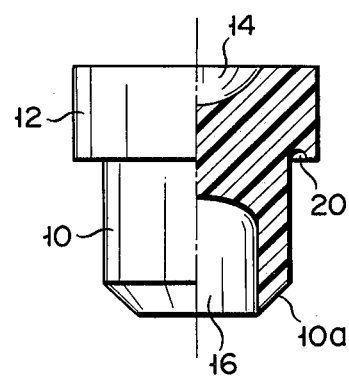
Figure 3:
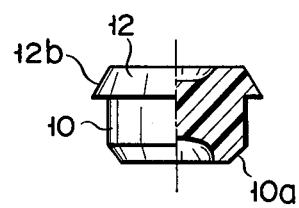

In order to prepare a medical container stopper with the polymeric material as described above, the respective components are kneaded with a Bumbury's mixer at 150° to 250° C., preferably 170° to 190° C. to pelletize them. The pellets are injected at 120° to 250° C. and preferably at 200° to 220° C. As shown in FIG. 1, a stopper prepared by injection molding in this manner has a cylindrical body 10 with a tapered end surface 10a, and a head 12 of a larger diameter. Recesses 14 and 16 extend toward each other from the top surface of the head 12 and the bottom surface of the cylindrical body 10, thus defining a thin portion 12a for facilitating piercing by a blood collection cannula or the like. An annular groove 18 is formed at that portion of the body 10 which is close to the head 12. This annular groove 18 prevents the stopper from dropping out from the container when it is forced into the container. A stopper shown in FIG. 2 is basically of the same construction as that shown in FIG. 1 except that an annular groove 20 is formed at the lower surface of the head 12 which projects outward from the body 12. Therefore, the same reference numerals denote the same parts in FIGS. 1 and 2. The annular groove 20 also serves to prevent the stopper from dropping inside the container. A stopper shown in FIG. 3 is the so-called vial stopper and is of the same construction as that shown in FIG. 1 except that the overall configuration is flatter and the head 12 has an inversely tapered outer surface 12b.

Figure 4:
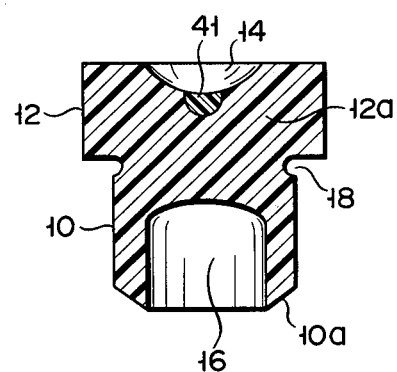
FIG. 4 is a sectional view of a further medical container stopper according to the present invention.

FIG. 4 shows a stopper of the type wherein no gap is formed between the cannula and the stopper and the seal therebetween is held without failure, upon piercing the stopper with a cannula such as a blood collection cannula. The stopper shown in FIG. 4 is different from that shown in FIG. 1 in that a sealing member 41 is embedded at the center of the bottom surface (where the cannula is pierced) of the recess 14. The sealing member 41 may be prepared by insert molding a styrene-based elastomer such as TR2104 or G7705 available from Shell Chemical Inc. (having a hardness of 55 or less according to JISA) during the injection molding of the stopper. Alternatively, the sealing member 41 may be prepared by forming a stopper having a recess at the center of the bottom surface and flowing a liquid rubber such as silicone sealant therein. The most preferred composition of the stopper parts, excluding the sealing member, comprises 35 parts by weight of Vistanex MML-100, 25 parts by weight of PBXL-50 partially crosslinked butyl rubber, 25 parts by weight of 1,2-polybutadiene (PB830 available from Nihon Gosei Kagaku, Inc.), 10 parts by weight of a styrene-based elastomer (G1652 available from Shell Chemical, Inc.), and 10 parts by weight of liquid paraffin.

After preparing the stopper in this manner, it may be radiated with γ-rays so as to improve its mechanical strength.

Examples to show the properties of the polymeric material for the stopper of the present invention will now be described.

EXAMPLE 1

Components shown in Table 1 below were kneaded with a Bumbury's mixer at 190° C. for 10 minutes to prepare the mold materials. Molded samples of these materials were then subjected to the transfusion rubber stopper test of the ninth amended Japanese Pharmacopeia. The results obtained are shown in Table 3.

TABLE 1

| Sample No. | Components | Parts by Weight |
|---|---|---|
| 1 | Vistanex MML - 100 | 60 |
|   | Polyester elastomer pelprene P - 150M | 20 |
|   | Ethylene-ethyl acrylate copolymer DPOJ - 9169 | 20 |
| 2 | Vistanex MML - 100 | 40 |
|   | Pelprene P - 150M | 20 |
|   | Thermorun 3600 | 20 |
|   | Talc | 20 |
| 3 | Vistanex MML - 140 | 40 |
|   | Pelprene P - 150M | 20 |
|   | Thermorun 3600 | 5 |
|   | Talc | 20 |
|   | DPOJ - 9169 | 15 |
| 4 | Polysarbromobutyl X2 | 60 |
|   | Pelprene P - 150M | 20 |

TABLE 1-continued

| Sample No. | Components | Parts by Weight |
|---|---|---|
| | DPOJ - 9169 | 20 |

Sample No. 4 was radiated with $^{60}$Co-rays at a dose of 3.5 Mrad.

TABLE 2

| Test Item | Present Invention | | | | Prior Art |
| | Sample 1 | Sample 2 | Sample 3 | Sample 4 | |
|---|---|---|---|---|---|
| ΔpH | 0.23 | 0.35 | 0.13 | 0.23 | 1.30 |
| ΔPermanganic acid consumption | 0.50 | 0.48 | 0.65 | 0.38 | 6.50 |
| Bubbling | Within 1 minute | Within 1 minute | Within 1 minute | Within 1 minute | Within 3 minutes |
| Ultraviolet ray absorption | 0.04 | 0.08 | 0.23 | 0.18 | 1.82 |
| Heavy metal Zn | ND* | ND* | ND* | ND* | ND* |
| Pb | ND* | ND* | ND* | ND* | ND* |
| Cd | ND* | ND* | ND* | ND* | ND* |
| Property | 99.6 | 99.7 | 99.8 | 99.6 | 99.5 |

*ND indicates not detectable.

TABLE 3

| Test Item | Sample | | | | Measuring Method |
| | 1 | 2 | 3 | 4 | |
|---|---|---|---|---|---|
| 100% modulus (kg/cm$^2$) | 100 | 110 | 115 | 120 | JISK301 |
| Elongation (%) | 720 | 650 | 630 | 500 | JISK301 |
| Tensile strength (kg/cm$^2$) | 130 | 150 | 120 | 510 | JISK301 |
| Elongation set (%) | 52 | 65 | 63 | 11 | (1) |
| Oxygen gas barrier property | 190 | 170 | 180 | 210 | (2) |

(1) After elongating by 100%, the sample was left to stand for 10 minutes in the elongated state and the measurement was then made at 20° C. after another 10 minutes.
(2) The sample was measured in the form of a film of 500 μm thickness. (ml/m$^2$; 1 atm for 24 hours)

Figure 5:
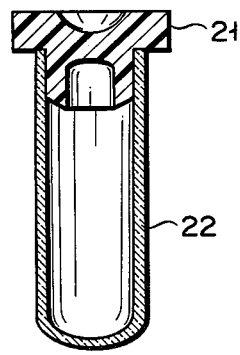
FIG. 5 is a sectional view showing a vacuum blood collecting tube using the stopper of the present invention.

The stopper of the present invention is suitable for use with a vacuum blood collecting tube as shown in FIG. 5. Referring to FIG. 5, a blood collecting tube 22 which is evacuated to a vacuum of an order to allow suction of blood in a predetermined amount is hermetically sealed with a stopper 21 as shown in FIG. 1. Thus, the vacuum in the stopper is held.

The medical container stopper of the present invention as described above shows rubber-like elasticity. Therefore, it has a sealing function for a long period of time and provides good resealability (i.e., sealability after piercing with a cannula). The stopper does not contain additives which might cause elution and allows more precise analysis and safe storage of contents in the container than the conventional stoppers. The stopper of the present invention does not cause deterioration of the contents and can maintain the internal vacuum in a vacuum blood collecting tube for a relatively long period of time.

Since the stopper of the present invention is made of a material which allows injection molding, it has the same properties before and after molding, unlike a conventional stopper which shows plasticity before molding and elasticity after molding. Therefore, a stopper of desired properties may be easily prepared by selecting a suitable material. Since the stopper is not vulcanized, runners and sprues may be put to use again without requiring firing. Injection molding also shortens the molding time over the conventional molding method, which requires a step of vulcanization. The mold releasability of the stopper of the present invention is excellent, and mass production of the stopper is facilitated.

With a stopper having a sealing member of the present invention, since no gap is formed between the cannula and the stopper parts upon piercing the cannula therethrough, leakage of blood and resultant contamination of the stopper are prevented.

What we claim is:

1. A medical container stopper for hermetically sealing an opening of a rigid medical container, comprising an injection-moldable polymeric material containing a blend of 30 to 90% by weight of a butyl-based rubber and 70 to 10% by weight of a thermoplastic elastomer.

2. A stopper according to claim 1, wherein the butyl-based rubber is selected from the group consisting of polyisobutylene, isobutylene-isoprene rubber, partially crosslinked isobutylene-isoprene rubber, and a halogenated isobutylene-isoprene rubber.

3. A stopper according to claim 2, wherein the thermoplastic elastomer is selected from the group consisting of a polyester elastomer, a styrene-based elastomer, 1,2-polybutadiene, and a polyolefin elastomer.

4. A stopper according to claim 2, wherein the polymeric material contains no more than 30% by weight of an olefin-based polymer for improving moldability.

5. A stopper according to claim 4, wherein the olefin-based polymer for improving moldability is selected from the group consisting of polypropylene, polyethylene, an ethylene-ethyl acrylate copolymer, liquid paraffin, wax and an ethylene-vinyl acetate copolymer.

6. A stopper according to claim 1, wherein the polymeric material contains not more than 80% of a filler based on a total weight of the filler and the mixture.

7. A stopper according to claim 6, wherein the filler is selected from the group consisting of carbon black, clay, talc, and white carbon.

8. A stopper according to any one of claims 1 to 7, wherein the stopper has a thin portion through which a cannula may be pierced.

9. A stopper according to claim 8, comprising a sealing member formed within the thin portion so as to prevent formation of a gap between the stopper and the cannula upon piercing of the cannula through the thin portion.

10. A stopper according to claim 9, wherein the sealing member comprises a styrene-based elastomer.

11. A stopper according to claim 9, wherein the sealing member is formed by flowing liquid rubber in a recess in said thin portion.

12. A stopper according to claim 4 wherein the olefin-based polymer is present in an amount of between 10% and 20% by weight.

13. A stopper according to claim 1 wherein the butyl-based rubber is present in an amount of between 50% and 70% by weight.

14. A stopper according to claim 6 wherein the filler is present in an amount of between 20% and 40% by weight.

* * * * *